(12) United States Patent
Bruno

(10) Patent No.: US 12,105,776 B2
(45) Date of Patent: Oct. 1, 2024

(54) DYNAMIC FEATURE NAMES

(71) Applicant: Capital One Services, LLC, McLean, VA (US)

(72) Inventor: Michael Bruno, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 965 days.

(21) Appl. No.: 17/117,995

(22) Filed: Dec. 10, 2020

(65) Prior Publication Data

US 2022/0188562 A1  Jun. 16, 2022

(51) Int. Cl.
*G06N 20/00* (2019.01)
*G06F 18/25* (2023.01)
*G06F 40/295* (2020.01)
*G06Q 20/40* (2012.01)

(52) U.S. Cl.
CPC .......... *G06F 18/253* (2023.01); *G06F 18/251* (2023.01); *G06F 40/295* (2020.01); *G06N 20/00* (2019.01); *G06Q 20/4016* (2013.01)

(58) Field of Classification Search
CPC .... G06F 18/253; G06F 18/251; G06F 40/295; G06N 20/00; G06Q 20/4016
See application file for complete search history.

(56) References Cited

U.S. PATENT DOCUMENTS

| | | | |
|---|---|---|---|
| 8,402,543 B1 | 3/2013 | Ranjan et al. | |
| 9,875,445 B2 | 1/2018 | Amer et al. | |
| 10,817,576 B1 * | 10/2020 | Davidovich | G06F 3/0484 |
| 10,936,585 B1 * | 3/2021 | Echeverria | G06N 5/00 |
| 11,042,579 B2 * | 6/2021 | Wegryn | G06F 16/3344 |
| 11,086,869 B1 * | 8/2021 | Aleti | G06F 16/2453 |
| 11,113,294 B1 * | 9/2021 | Bourbie | G06F 16/24568 |
| 11,138,191 B1 * | 10/2021 | De Boer | G06F 16/2465 |
| 11,238,048 B1 * | 2/2022 | Breeden | G06F 16/906 |
| 11,238,049 B1 * | 2/2022 | James | G06F 40/30 |
| 11,500,871 B1 * | 11/2022 | Kulkarni | G06N 20/00 |
| 2008/0235199 A1 * | 9/2008 | Li | G06F 16/243 |

(Continued)

OTHER PUBLICATIONS

Chaiken, Ronnie, et al. "Scope: easy and efficient parallel processing of massive data sets." Proceedings of the VLDB Endowment 1.2 (2008): 1265-1276 (Year: 2008).*

(Continued)

*Primary Examiner* — Andrew T McIntosh
(74) *Attorney, Agent, or Firm* — Banner & Witcoff, Ltd.

(57) ABSTRACT

Systems and methods are described herein for a feature generator that may generate values for a plurality of features based on the feature names The plurality of features may comprise pre-calculated features and dynamic features. While values of the pre-calculated features may have been calculated beforehand, the names of the dynamic features may comprise instructions for calculating the values of the dynamic features. The feature generator may parse, based on a dynamic feature grammar, the names of the dynamic features to determine the instructions for calculating the values of the dynamic features. The instructions may comprise a function token, data tokens, and/or parameter tokens. The feature generator may calculate the dynamic values based on the tokens. The feature generator may be a part of a machine learning based data analyzing system and generate inputs for the data analyzing system.

20 Claims, 8 Drawing Sheets

(56) References Cited

U.S. PATENT DOCUMENTS

| | | | | |
|---|---|---|---|---|
| 2017/0286507 | A1* | 10/2017 | Hosogi | G06F 16/256 |
| 2020/0110803 | A1* | 4/2020 | Djalali | G06F 3/0481 |
| 2021/0034623 | A1* | 2/2021 | Sabhanatarajan | G06F 16/2477 |
| 2021/0049158 | A1* | 2/2021 | Jiao | G06F 16/243 |
| 2021/0117232 | A1* | 4/2021 | Sriharsha | G06F 16/1734 |
| 2021/0117868 | A1* | 4/2021 | Sriharsha | G06F 17/18 |
| 2021/0149901 | A1* | 5/2021 | Fonseca de Lima | G06F 16/24522 |
| 2021/0241926 | A1* | 8/2021 | Chor | H04W 4/70 |
| 2022/0036177 | A1* | 2/2022 | Sriharsha | G06N 3/10 |

OTHER PUBLICATIONS

Giannakopoulou, Styliani Asimina, et al. "Cleanm: An optimizable query language for unified scale-out data cleaning." Proceedings of the VLDB Endowment 10.11 (2017): 1466-1477 (Year: 2017).*

* cited by examiner

DYNAMIC FEATURE NAMES

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure generally relate to systems and techniques for data analysis, and more specifically, to methods and systems for generating values of various features for use during data analysis.

BACKGROUND

Many organizations use electronic data and predictive data analysis models to enhance the efficiency of various business processes, aid their decision-making, and/or anticipate problems or opportunities. The organizations may use data analysis models based on machine-learning techniques and train the models by using operational data describing past events with evaluation data describing outcomes of the past events. Based on the outcomes predicted by the trained data analysis models, organizations may make decisions, adjust processes, or take other actions. For example, a financial organization may use trained data analysis models to detect potential fraudulent events associated with its customer's accounts or estimate risk scores of certain customer behaviors. The financial organization may take actions to prevent or remedy fraudulent events, or minimize risks based on the prediction of the data analysis models. Variables used as inputs by the data analysis models to make predictions may be referred to as "features." The data analysis models may comprise a feature generator that may be configured or programmed to generate certain features for the prediction process of the data analysis models.

However, after the data analysis models are deployed, the models may be fine-tuned to improve their accuracy on more specific applications. Additionally, the addition and construction of new features may improve the performance and the accuracy of data analysis models. Therefore, the evolving natures of the predictive data analysis models may require generations of new features and/or updating old features. Programmers or data analysts may need to update the software code and/or update the databases of the feature generator API to comprise information about various methods to generate values of the new features and/or generate the old features with even a minor change in the old features' criteria.

Data analysis models also may need to minimize the overall latency of the prediction process to produce fast predictions. For example, a financial organization may require a fast prediction (e.g., within milliseconds) of a high-risk event during a credit card transaction or while a customer is on the phone with a customer service agent requesting an address change. Such fast prediction may require a feature generation process for the data analysis models that also operates in a low-latency fashion. Some of the features may be pre-calculated via batch processing so that they may be ready for use when needed by the data analysis models. However, some features, especially new features, old features with updated criteria, or time-dependent features, may not be pre-calculated and may need to be generated just before the prediction process.

Therefore, it may be desirable that the feature generation process in machine learning based data analysis models minimizes latency and is highly scalable such that features can be added or constructed without any human intervention and/or software updates. Aspects described herein may address these and other problems, and generally improve the quality, efficiency, and accuracy of data analysis models by using a scalable and low-latency feature generator.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems, as described herein, may comprise a highly scalable and low-latency feature generator that generates features for use as inputs by a data analysis system (e.g., a machine learning based fraud detection system for a financial organization for identifying fraudulent events associated with customer's accounts, etc.). The feature generator may receive a request to determine the values of a plurality of features (e.g., account balance, number of address changes in the last six months, the average account balance in the last one months, etc.) associated with an object (e.g., a customer's account, etc.). The request may comprise feature names of the plurality of features. The plurality of features may comprise pre-calculated features and dynamic features. The values of the pre-calculated features may be calculated beforehand, while the names of the dynamic features may comprise instructions for calculating the dynamic values of the dynamic features.

The feature generator may classify the feature names of the plurality of features into a group of pre-calculated features and a group of dynamic features. The feature generator may determine the values of the pre-calculated features by retrieving the values from one or more databases based on the names of the pre-calculated features.

The feature generator may parse the instructions in the names of the dynamic features to determine a function token and one or more data tokens for each of the dynamic features. The feature generator may also determine one or more parameter tokens the parsed instructions in the names of the dynamic features. The feature generator may parse the instructions by using a dynamic feature grammar and/or natural language processing models. The feature generator may determine the values of the dynamic features by using the data tokens and/or parameter tokens to retrieve data from one or more databases and then executing a function corresponding to the function token on the retrieved data.

After determining the values of the pre-calculated features and the dynamic features, the feature generator may output the values to one or more data analysis systems These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
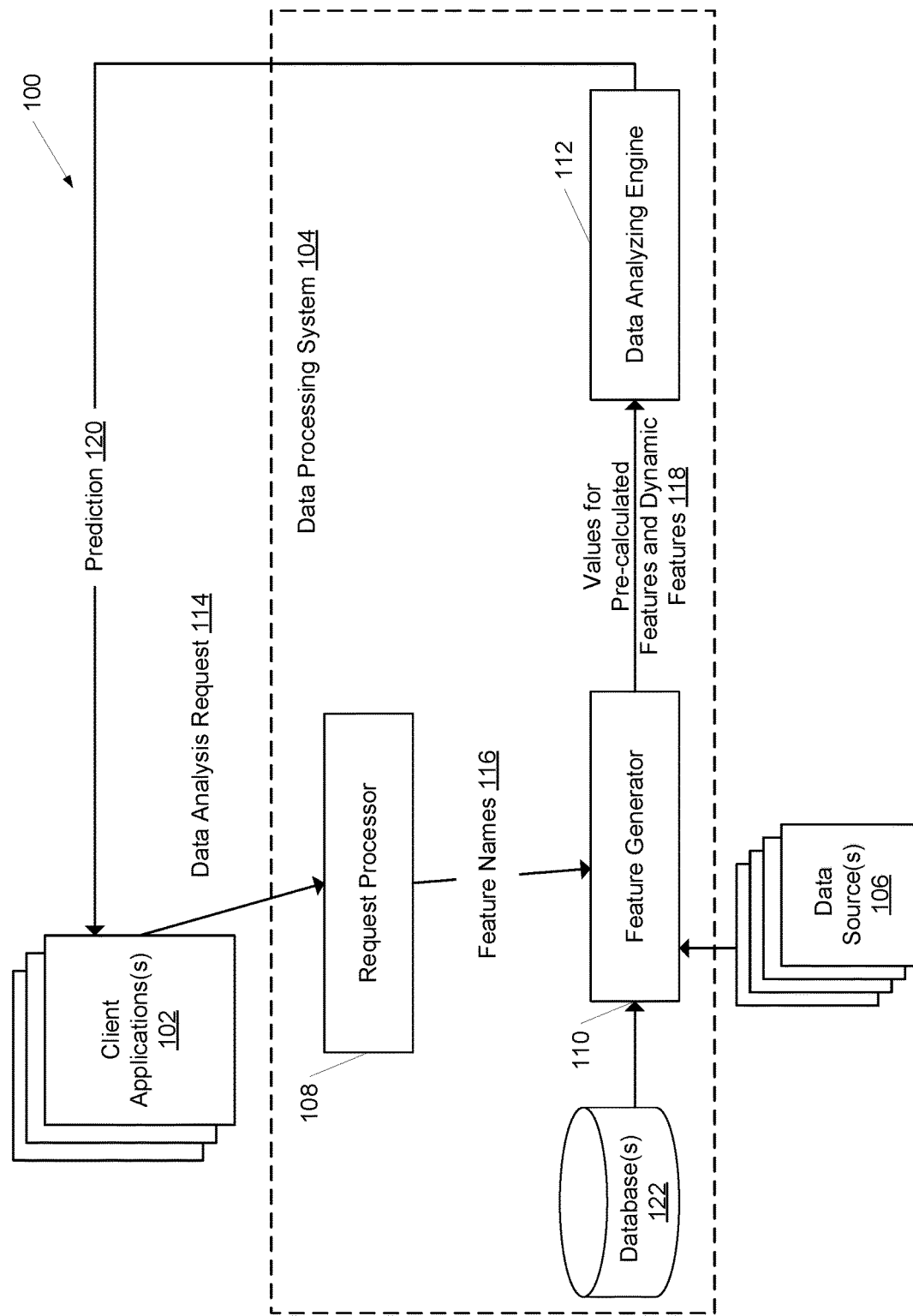
FIG. 1 shows an example data analysis system comprising a feature generator in which one or more aspects described herein may be implemented.

In the following description of the various embodiments, reference is made to the accompanying drawings, which form a part hereof, and in which is shown by way of illustration, various embodiments in which aspects of the disclosure may be practiced. It is to be understood that other embodiments may be utilized, and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for generating inputs for data analyzing systems. Analysis of data may comprise collection, organization, analysis, interpretation, and presentation of data. Data processing systems for analyzing data may use machine learning algorithms where the systems may be trained on sample data, known as training data, in order to make predictions or decisions. Such machine learning based data processing systems may be used in a wide variety of technologies, such as email filtering, computer vision, recommendation engines, autonomous vehicles, healthcare, fraud detection, malware detection, etc. A particular organization may deploy machine learning based data processing systems in various applications. For example, a financial organization's data analysis model for fraud detection may be integrated into one or more applications that process credit or debit card transactions, money transfers, and/or other financial transactions. Aspects described herein may also be related to other data processing systems, such as data processing systems that may involve some combinations of converting data from one form to another, validating data, arranging data items in some sequence and/or in different sets, summarizing data, and combining multiple pieces of data.

Data processing systems may accumulate large amounts of data, with different data created for different purposes and by different sources. For example, a financial organization may collect, for multiple customers, data associated with bank accounts and/or credit card accounts of the customers, transactions data, and/or other account information for the multiple customers. The data processing systems may not require all the accumulated data but a small portion of the accumulated data to generate predictions. For example, the financial organization may need data for a certain customer in order to detect whether there are any fraudulent events associated with that customer's account. The smaller portion of data that act as inputs for the data processing systems may be presented to the data processing systems as a set of "features," "variables," or "attributes."

A feature is an individual observable and measurable property or characteristic of an object, an event, a group of objects, or a group of events. For example, in a data processing system for detecting fraudulent events in a financial organization, an object may be a customer's account in a financial organization, a social security number associated with a customer, a loan associated with a customer, a credit card associated with a customer, etc. An event may comprise a customer of a financial institution making an online purchase, a customer swiping a credit card at various retail stores, a customer requesting to change his residential address, etc. Features that may be associated with a credit card of a customer may comprise a customer's credit balance, credit score, a number of credit card usage in the last week, a number of times the customer changes his residential address in the last six months, highest purchase in the last ninety days, etc. Each feature may be associated with a feature name and a feature value. For example, a feature with the feature name "credit score" may have a value in the range of 200-850.

The data processing systems may use a feature generator that may generate a set of features for the prediction process. For example, in a financial organization, a feature generator, for a data processing system for detecting fraudulent transactions, may generate a set of features by fetching the relevant elements from a customer's profile along with any other necessary information about the transactions. The feature generator may provide the features to the data processing system in a required format. In some instances, in order to generate a feature in the required format, a feature generator may need to estimate the feature value from the accumulated data of the data processing system, convert a portion of the data from one form to another, validate a portion of the data, arrange data items in some sequence and/or in different sets, summarize data, combine multiple pieces of data, and so on. For example, in order to calculate the average balance of a credit card account of a customer in the ninety days, the feature generator may need to retrieve account balances for all of the last ninety days and then calculate the average from the retrieved data.

For some applications, such as ones involving detecting fraudulent activities associated with a customer's account in a financial organization, it is critical that predictions can be delivered with low-latency to ensure that these services produce fast predictions. Therefore, the data processing system must be able to provide predictions at low-latencies (e.g., 10s-100s of milliseconds) to avoid slowing down the applications. Therefore, a feature generator for the data processing system must also provide features at low-latencies.

Existing data processing systems may comprise feature generators that reduce latencies by pre-calculating the values of features that would be later required for the prediction processes of the data processing systems (e.g., the pre-calculations for a set of features may be performed regularly on an hourly, daily, and/or weekly basis). The existing feature generators may calculate the values of the pre-calculated features via batch processing.

However, such feature generators may have a number of drawbacks and limitations.

First, not all features may be pre-calculated. Some of the features may be time-dependent and may need to be calculated just before the prediction process. Examples of features that are time-dependent may comprise a number of PIN number change requests in the last five minutes, a number of residential address change requests in the last hours, purchases made in the last three hours, etc. Second, after a trained data processing system is deployed, the models may be fine-tuned to improve their accuracy on more specific applications. Some of the features, based on specific time windows, may need to be fine-tuned such that the updated features are more informative to the data processing system. For example, instead of using a feature that indicates a number of credit card late payments in the last two years to estimate likely loan defaults, a data processing system of a financial organization for predicting loan defaults may be improved by using a feature that indicates a number of credit card late payments in the last three months. Third, the addition and construction of new features may improve the performance and the accuracy of the data programming systems. For example, the data analysis model of the financial organization for predicting loan defaults may require a new feature that indicates a number of late rent payments. Therefore, the evolving nature of the predictive data analysis models may require generations of new features. Programmers or data analysts may need to update the software code and/or update the databases of the feature generator API to comprise information about various methods to generate values of the new and updated features.

The feature generator described herein may improve the functioning of the data processing system by allowing, via "dynamic features," the addition of new features, the generation of time-dependent features just before the prediction process, and/or adjustments of old features without any human intervention and/or software updates of the feature generator. The feature names of the dynamic features may comprise instructions for calculating the dynamic values of the dynamic features. The feature generator described herein may be configured to generate the values of the dynamic features by parsing the instructions in the names of the dynamic features.

FIG. 1 illustrates an architectural level schematic of an environment 100 in which a data processing system with a feature generator with one or more aspects described herein may be implemented. Such a data processing system can be deployed in a financial organization to identify situations where a fraudster is using permutations of (possibly stolen) credentials to open new accounts, performing takeovers of customer's accounts, using stolen credit or debit cards for purchases, using stolen or forged checks, and/or submitting fraudulent loan applications. The data processing system may mark particular transaction events and/or accounts as fraudulent. The feature generator described in FIG. 1 may also be used in data processing systems of other technologies, such as email filtering, computer vision, recommendation engines, autonomous vehicles, healthcare, malware detection, etc.

The environment 100 may comprise client applications 102, a data processing system 104, and data sources 106. The data processing system may comprise a request processor 108, a feature generator 110, and a data analyzing engine 112. The request processor 108 of the data processing system 104 may receive data analysis requests 114 from the client applications 102. The data analysis requests 114 may comprise data associated with an object (e.g., a customer's account in a financial organization) or an event (e.g., a customer swiping a credit card or changing his residential address). Based on the data analysis requests 114, the request processor 108 may determine one or more features that may be required for the prediction process and generates a list of feature names 116. The request processor 108 may provide the list of feature names 116 to the feature generator 110. The feature generator 110 may receive a list of feature names 116 from the request processor 108. The feature generator 110 may determine which features in the list of feature names 116 are pre-calculated features and which features are dynamic features. The feature generator 110 may determine the values of both the pre-calculated features and the dynamic features and provide the names and values of the dynamic and pre-calculated features 118 to the data analyzing engine 112. The feature generator 110 may determine the values of the dynamic features by parsing instructions comprised in the names of the dynamic features for calculating the values of the dynamic features. The data analyzing engine 112 may use the names and values of the pre-calculated and dynamic features 118 and machine learning techniques to provide a prediction 120 to the client applications 102.

The client applications 102 may comprise various applications of an organization which communicates with the data processing system 104 for predictions regarding various objects and/or events. For example, a financial organization's data processing system for fraud detection may be integrated into one or more client applications that process credit or debit card transactions, money transfers, loan proceedings, and/or other financial transactions. The client applications 102 may use the predictions from the data processing system to anticipate problems or opportunities.

The data processing system 104 may service data analysis requests 114 from the client applications 102 locally, by executing on the same host computing device as the data processing system 104, by providing an application programming interface (API) to the client applications 102, by receiving function calls from the client applications 102, by providing a hardware command interface to the client applications 102, or otherwise by providing a local channel to the client applications 102. In a further embodiment, the data processing system 104 may service data analysis requests 114 from the client applications 102 over a data network, such as a local area network (LAN), a wide area network (WAN) such as the Internet as a cloud service, a wireless network, a wired network, or other data networks. Any means of establishing a communications link between the computers may be used. The existence of any of various network protocols such as TCP/IP, Ethernet, FTP, HTTP and so on, and of various wireless communication technologies such as GSM, CDMA, WiFi, and LTE, is presumed, and the various computing devices described herein may be configured to communicate using any of these network protocols or technologies.

The data transferred between the client applications 102, the data processing system 104, and the data sources 106 in the environment 100 may comprise secure and sensitive data, such as confidential documents, customer personally identifiable information, and account data. It may be desirable to protect transmissions of such data using secure network protocols and encryption and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may comprise built-in features such as hardware-accelerated SSL and HTTPS, WS-Security, and/or firewalls. Such specialized hardware may be installed and configured in the environment 100 in front of one or more computing devices such that any external devices may communicate directly with the specialized hardware.

The data processing system 104 may be in communication with several data sources 106 over a data network or over a local channel such as a system bus, an API, and so on. The data sources 106 may comprise an enterprise data source, a data storage device, a software application, a database, an input device, a document scanner, a credit card machine, a user, a hardware computing device with a processor and memory, and/or other entities. Some or all of the data described herein may be stored using any of a variety of data storage mechanisms, such as databases 122 in FIG. 1. These databases may comprise, but are not limited to, relational databases, hierarchical databases, distributed databases, in-memory databases, flat file databases, XML databases, NoSQL databases, graph databases, and/or a combination thereof.

If deployed in a financial organization, the data processing system 104 may accumulate data for the customers of the financial organization and their accounts. The data may comprise bank data, card data, and account data. Bank data may comprise transaction level data as well as checking and savings balances. Card data may comprise transaction level data of credit cards, credit card balances, annual percentage rate (APR), minimum payments, days in a billing cycle, etc. Account data may comprise personal information of the customers, such as name, social security number, residential address, work address, phone number, last time contact information was updates, etc. The account data may comprise other information associated with the customers, such as total revolving saving, checking and credit balances, and monthly payments on auto loans, mortgages, external credit cards, student loans, etc.

The feature generator 110 may be configured to receive the list of feature names 116 from the request processor 108 and generate values for the features in the list of feature names 116 from data accumulated data from the data sources 106. The feature generator 110 may be configured to identify one or more data sources 106 (e.g., an automated scan, based on user input, customer transactional data, customer account information, etc.) and extract data from the identified data sources 106. The feature generator 110 may change the formats of the data. The feature generation may pre-calculate the values of some of the features (e.g., pre-calculated features) in the list of feature names 116 while generating the values of some of the features (e.g., dynamic features). The feature generator may determine which of the features in the list of feature names are pre-calculated features and which features are dynamic features. The feature generator may retrieve values for the pre-calculated features. The feature generator, by using a set of artificial intelligence rules, may determine values for the dynamic features. The feature generator may provide for names and values of the pre-calculated and dynamic features 118 to the data analyzing engine 112.

The data analyzing engine 112 may use the names and values of the pre-calculated and dynamic features 118 and machine learning techniques, as described below, to provide a prediction 120 to the client applications 102. These machine learning ensembles in the data analyzing engine 112 may be used to respond to data analysis requests by the client applications 102 and provide machine learning results as the prediction 120. The prediction 120 may comprise a classification, a confidence metric, an inferred function, a regression function, an answer, a recognized pattern, a rule, a recommendation, or other results. Machine learning mechanisms in the data analyzing engine 112, as used herein, comprises one or more modules, computer executable program code, logic hardware, and/or other entities configured to learn from or train on training data, and to apply the learning or training to provide results or analysis for subsequent data. In one embodiment, the data analyzing engine 112 may provide, access, or otherwise use predictive analytics. Predictive analytics is the study of past performance, or patterns, found in historical and transactional data to identify behavior and trends in unknown future events. In certain embodiments, the prediction may be applied through at least two general techniques: regression and classification. Regression models may attempt to fit a mathematical equation to approximate the relationship between the features being analyzed. These models may comprise "Discrete Choice" models such as Logistic Regression, Multinomial Logistic Regression, Probit Regression, or the like. When factoring in time, Time Series models may be used, such as Auto Regression—AR, Moving Average—MA, ARMA, AR Conditional Heteroskedasticity—ARCH, Generalized ARCH—GARCH, and Vector AR—VAR. Other models comprise Survival or Duration analysis, Classification and Regression Trees (CART), Multivariate Adaptive Regression Splines (MARS), and the like. Classification is a form of artificial intelligence that uses computational power to execute complex algorithms in an effort to emulate human cognition. Classification methods may comprise Neural Networks, Radial Basis Functions, Support Vector Machines, Nave Bayes, k-Nearest Neighbors, Geospatial Predictive modeling, etc.

Figure 2:
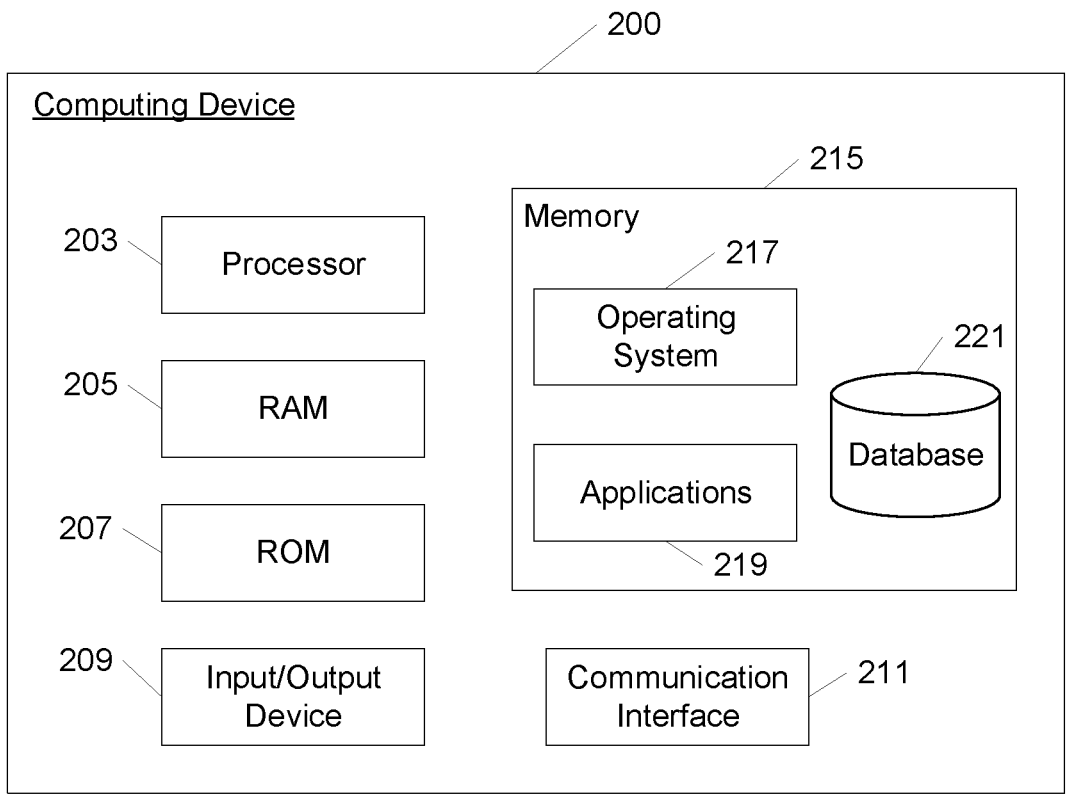
FIG. 2 shows an example computing device in accordance with one or more aspects described herein

Turning now to FIG. 2, a computing device 200 that may be used with one or more of the computational systems (e.g., the client applications 102, the request processor 108, the feature generator 110, and/or the data analyzing engine 112) is described. The computing device 200 may comprise a processor 203 for controlling the overall operation of the computing device 200 and its associated components, including the RAM 205, the ROM 207, the input/output device 209, the communication interface 211, and/or the memory 215. A data bus may interconnect the processor(s) 203, the RAM 205, the ROM 207, the memory 215, the I/O device 209, and/or the communication interface 211. In some embodiments, the computing device 200 may represent, be incorporated in, and/or comprise various devices such as a desktop computer, a computer server, a mobile device, such as a laptop computer, a tablet computer, a smart phone, any other types of mobile computing devices, and the like, and/or any other type of data processing device.

The input/output (I/O) device 209 may comprise a microphone, a keypad, a touch screen, and/or a stylus through which a user of the computing device 200 may provide input, and may also comprise one or more of a speaker for providing audio output and a video display device for providing textual, audiovisual, and/or graphical output. Software may be stored within the memory 215 to provide instructions to the processor 203, allowing the computing device 200 to perform various actions. The memory 215 may store software used by the computing device 200, such as an operating system 217, application programs 219, and/or an associated internal database 221. The various hardware memory units in the memory 215 may comprise volatile and nonvolatile, removable and non-removable media implemented in any method or technology for storage of information such as computer-readable instructions, data structures, program modules, or other data. The memory 215 may comprise one or more physical persistent memory devices and/or one or more non-persistent memory devices. The memory 215 may comprise, but is not limited to, a random access memory (RAM) 205, a read-only memory (ROM) 207, an electronically erasable programmable read-only memory (EEPROM), a flash memory or other memory technology, optical disk storage, magnetic cassettes, magnetic tape, magnetic disk storage or other magnetic storage devices, or any other medium that may be used to store the desired information and that may be accessed by processor 203.

The communication interface 211 may comprise one or more transceivers, digital signal processors, and/or additional circuitry and software for communicating via any network, wired or wireless, using any protocol as described herein. The Processor 203 may comprise a single central processing unit (CPU), which may be a single core or multi-core processor, or may comprise multiple CPUs. The processor(s) 203 and associated components may allow the computing device 200 to execute a series of computer-readable instructions to perform some or all of the processes described herein. Although not shown in FIG. 2, various elements within the memory 215 or other components in the computing device 200, may comprise one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. The processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce the data retrieval and data manipulation time by not needing to communicate over a network with a back-end database server. These types of caches and others may be comprised in various embodiments, and may provide potential advantages in certain implementations of devices, systems, and methods described herein, such as faster response times and less dependence on network conditions when transmitting and receiving data.

Although various components of the computing device 200 are described separately, the functionality of the various components may be combined and/or performed by a single component and/or multiple computing devices in communication without departing from the invention.

Figure 3:
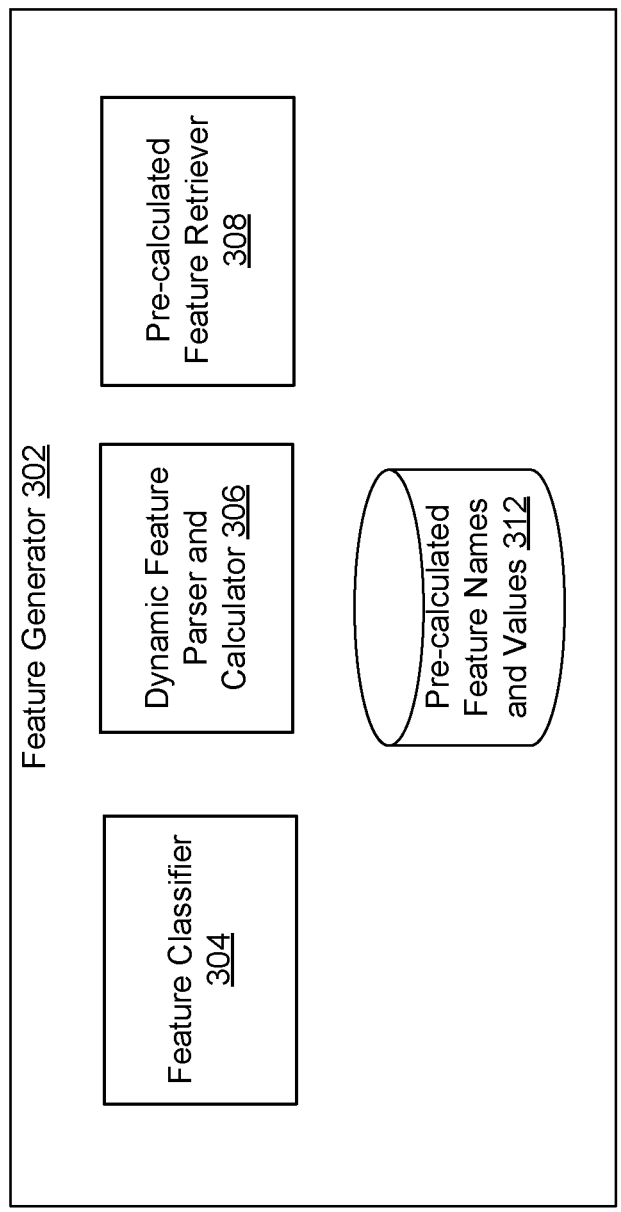
FIG. 3 shows an example feature generator according to one or more aspects of the disclosure.

FIG. 3 shows an example of a feature generator 302. The feature generator 302 may comprise software components referred to herein as a feature classifier 304, a dynamic feature parser and calculator 306, and a pre-calculated feature retriever 308. The feature generator 302 may also comprise a pre-calculated names and values database 312.

The feature classifier 304 may receive a list of feature names and classify the features in the list of feature names as being either names of pre-calculated features or names of dynamic features. The feature classifier 304 may comprise artificial intelligence modules, such as one or more natural language processing modules. The natural language processing modules in the feature classifier 304 may analyze the syntax of the names in the list of names by using natural language patterns. The natural language processing modules in the feature classifier 304 may comprise a dictionary reference for names of pre-calculated features and determine whether any of the names in the received list of names match any one of the names in the dictionary reference. The natural language processing modules in the feature classifier 304 may determine that a feature in the list of feature names is not a pre-calculated feature but a dynamic feature by determining that the name does not match with any one of the names in the dictionary reference. Additionally or alternately, the natural language processing modules in the feature classifier 304 may classify the names of the pre-calculated features and the dynamic features by using any one of a variety of natural language processing techniques. Such natural language processing techniques comprise, but are not limited to, lexical semantics, named entity recognition, grammar induction, lemmatization, morphological segmentation, etc. The feature classifier 304 may send the names of the pre-calculated features to the pre-calculated feature retriever 308 and names of the dynamic features to the dynamic feature parser and calculator 306.

The pre-calculated feature retriever 308 in the feature generator may pre-calculate the values of pre-calculated features or some regularly requested features and save the calculated values in a database (e.g., the pre-calculated feature names and values database 312). The pre-calculated feature retriever 308 may determine the values of the regularly requested features by batch processing the calculations at a regular interval (e.g., once a day, once a week, bi-weekly, etc.). The pre-calculated feature retriever 308 may save the calculated values in the pre-calculated names and values database 312. The pre-calculated feature retriever 308 may receive the names of pre-calculated features from the feature classifier 304 and use the names to retrieve the values of the pre-calculated features from the pre-calculated names and values database 312.

The dynamic feature parser and calculator 306 may receive the names of dynamic features from the feature classifier 304. The names of the dynamic features comprise embedded instructions for determining the values of the dynamic features. The dynamic feature parser and calculator 306 may comprise artificial intelligence modules, such as one or more natural language processing modules that parse the instructions from the names of the dynamic features and then determine the values of the dynamic features based on the parsed instructions.

When the natural language processing modules in the dynamic feature parser and calculator 306 parses the instructions, the modules may identify various types of tokens. These various types of tokens may aid in interpreting the instructions to calculate the values of the dynamic features. The types of tokens may comprise "function tokens," "data tokens," and "parameter tokens." While only three types of tokens are described herein, it will be appreciated that the feature generator described herein may be reconfigured to identify any number of token types. The data token in the name of a dynamic feature may indicate the data item needed to calculate the value of the dynamic feature. The function token in the name of the dynamic feature may indicate the function to apply on the data item indicated by the data token to calculate the value of the dynamic feature. The parameter token may indicate any parameter associated with the data item, indicated in the data token, or any parameter associated with the function indicated in the function token. The tokens may be identified based on one or more grammar rules for dynamic feature names The grammar rules for the dynamic feature names may be determined by programmers of the feature generators, and/or the grammar rules may be learned during the training of the one or more natural language processing modules in the feature generator.

Based on the identified tokens, the dynamic feature parser and calculator 306 may retrieve data from multiple data sources (e.g., the data sources 106 and/or the databases 122 in FIG. 1) and perform one or more functions on the retrieved data to determine the values of the dynamic features. The natural language processing modules in the dynamic feature parser and calculator 306 may also parse the embedded instructions in the names of the dynamic features and identify tokens by using any of a variety of natural language processing techniques, such as lexical semantics, tokenization, named entity recognition, lemmatization, morphological segmentation, terminal extraction, automatic summarization, bags of words, natural language generation, and sentence segmentation.

The natural language processing modules in the feature classifier 304 and the dynamic feature parser and calculator 306 may be trained together or separately trained. Validation during the training process or during deployment in various client applications may provide information about where additional training is needed. The natural language processing modules in the feature classifier 304 and the dynamic feature parser and calculator 306 may also comprise stand-alone software packages.

Figure 4:
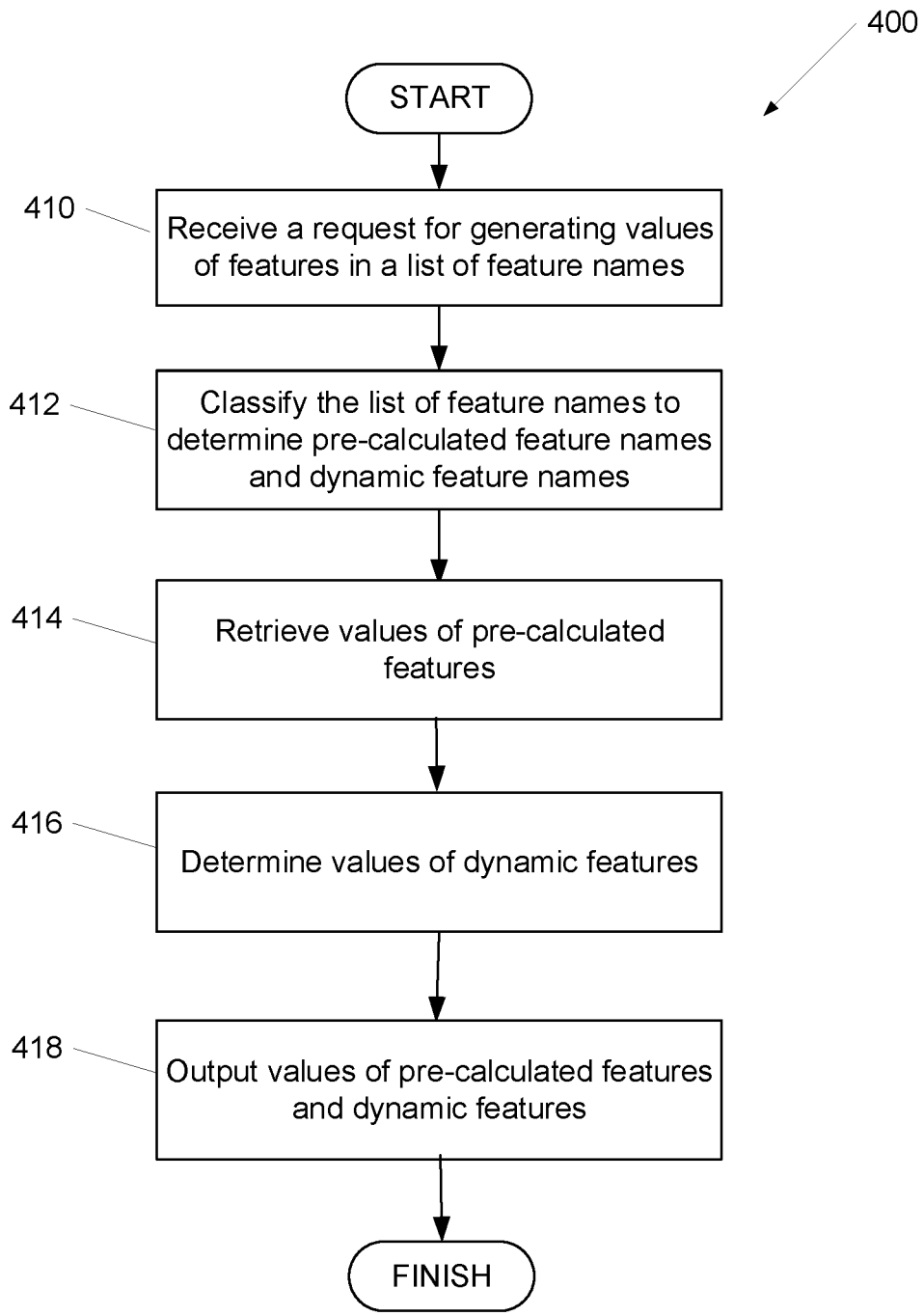
FIG. 4 shows a flowchart of an example process for generating values for a list of feature names according to one or more aspects of the disclosure.

FIG. 4 shows a flowchart 400 of an example process for generating values for a list of feature names by a feature generator (e.g., the feature generator 110 in FIG. 1 or the feature generator 302 in FIG. 3). Some or all of the steps of the flowchart 400 may be performed using one or more computing devices as described herein. In some embodiments, the actions in the flowchart may be performed in different orders and with different, fewer, or additional actions than those illustrated in FIG. 4. Multiple actions may be combined and/or divided into sub-actions in some implementations. The various steps of the flowchart 400 are described with the aid of the illustration 500 in FIG. 5.

Figure 5:
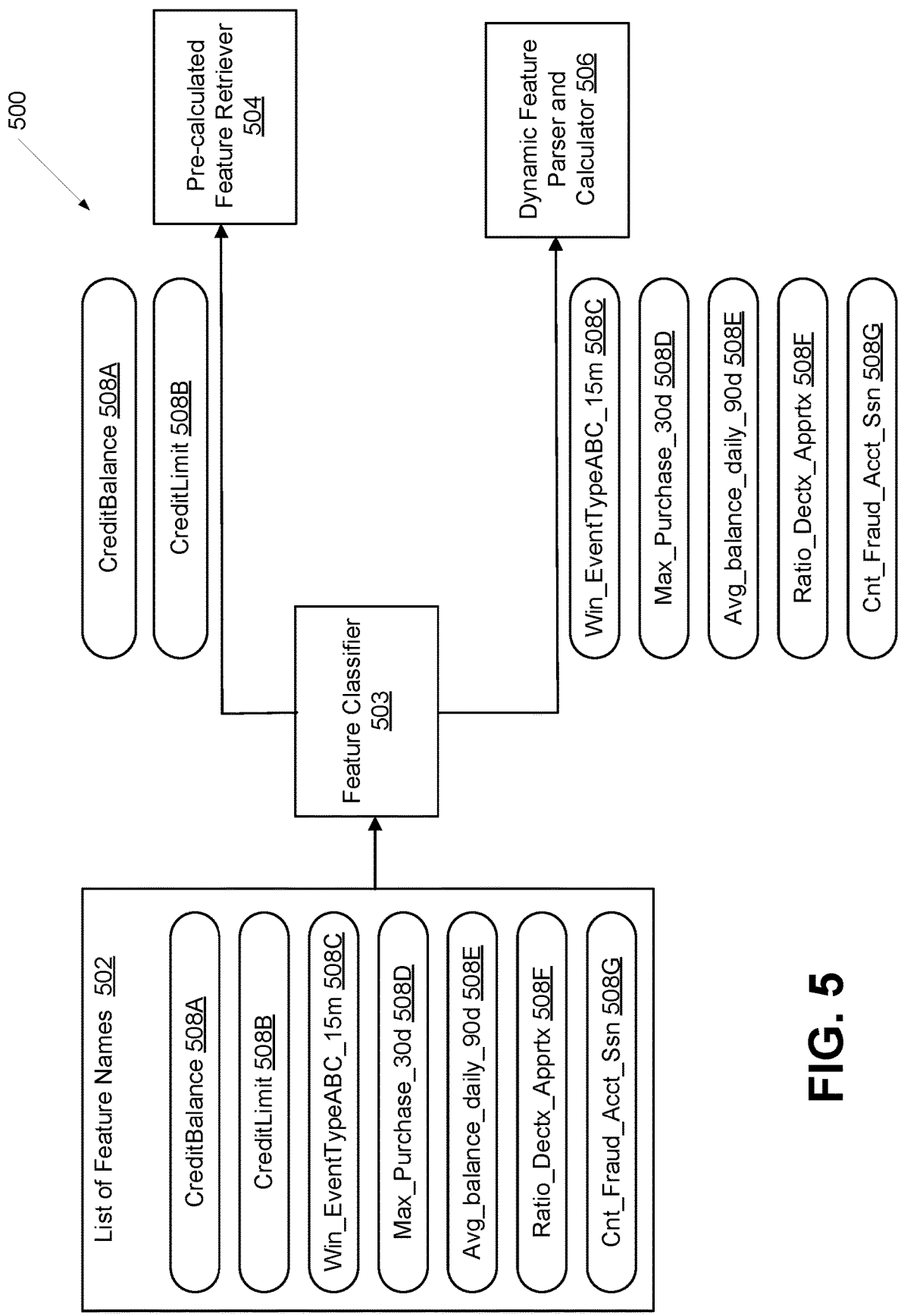
FIG. 5 shows an example classification of feature names according to one or more aspects of the disclosure.

The flowchart 400 begins at step 410, where the feature generator may receive data comprising a list of feature names and a request to generate values of the features in the list of feature names. The feature generator may receive the list from a request processor (e.g., the request processor 108 in FIG. 1) or a client application (e.g., one of the client applications 102 in FIG. 1). The list of feature names may comprise one or more names for pre-calculated features and/or one or more names for dynamic features. FIG. 5 illustrates an example list of feature names 502 comprising the names "CreditBalance" 508A, "CreditLimit" 508B, "Win_EventTypeABC_15m" 508C, "Max_Purchase_30d" 508D, "Avg_balance_daily_90d" 508E, "Ratio_Dectx_Apprtx" 508F, and "Cnt_Fraud_Acct_Ssn" 508G.

At step 412, a feature classifier of the feature generator (e.g., the feature classifier 304 in FIG. 3 or the feature classifier 503 in FIG. 5) may classify the names in the list of feature names to determine which names are names of pre-calculated features and which names are names for dynamic features by using natural languages processing techniques. In one embodiment, the feature classifier may maintain a dictionary reference for names of pre-calculated features and determine, by using natural language processing techniques, whether any of the names in the received list of names match any one of the names in the dictionary reference. The feature classifier may determine that a feature in the list of feature names is not a pre-calculated feature but a dynamic feature by determining that the name does not match with any one of the names in the dictionary reference. Additionally or alternately, the feature classifier may classify a name to be associated with a dynamic feature if the feature generator identifies certain token types (e.g., a function, data, or parameter token type) by using the natural language processing techniques. For the example list of feature names 502 in FIG. 5, the feature classifier 503 may classify the names "CreditBalance" 508A and "CreditLimit" 508B to be names of pre-calculated features and the names "Win_EventTypeABC_15m" 508C, "Max_Purchase_30d" 508D, "Avg_balance_daily_90d" 508E, "Ratio_Dectx_Apprtx" 508F, and "Cnt_Fraud_Acct_Ssn" 508G to be names of dynamic features. The feature classifier may send the names of the pre-calculated features to a pre-calculated feature retriever (e.g., the pre-calculated feature retriever 308 in FIG. 3 or the pre-calculated feature retriever 504 in FIG. 5) and the names of the dynamic features to a dynamic feature parser and calculator (e.g., the dynamic feature parser and calculator 306 in FIG. 3 or the dynamic feature parser and calculator 506 in FIG. 5).

Referring back to FIG. 4, at step 414, the feature generator may receive the names of pre-calculated features and use the names to retrieve the values of the pre-calculated features from one or more databases (e.g., the pre-calculated names and values database 312 in FIG. 3). In some embodiments, the feature generator may retrieve the values individually, while in other embodiments, the feature generator may retrieve the values in a batch. The feature generator may have previously determined the values of the pre-calculated features and saved the values in the databases. The pre-calculation of the values may be performed by batch processing the calculations at a regular interval (e.g., once a day, once a week, bi-weekly, etc.).

At step 416, the feature generator may receive the names of dynamic features and determine the values of the dynamic features based on the instructions embedded in the names of the dynamic features. The feature generator may use natural language processing techniques to that parse the instructions from the names of the dynamic features to identify function tokens, data tokens, and/or parameter tokens based on one or more grammar rules for dynamic feature names. Based on the identified data tokens and/or parameter tokens, the feature may retrieve data from multiple data sources (e.g., the data sources 106 and/or the databases 122 in FIG. 1) and perform, based on the function tokens and/or parameter tokens, one or more functions on the retrieved data to determine the values of the dynamic features.

At step 418, the feature generator may output the values of the pre-calculated features and dynamic features to one or more data analyzing systems (e.g., the data analyzing engine 112 in FIG. 1, machine learning based systems for fraud detection, email filtering, autonomous vehicle, etc.). The data analyzing system may use the features to identify a relationship between the features and predict an event or result associated with the features.

Figure 6:
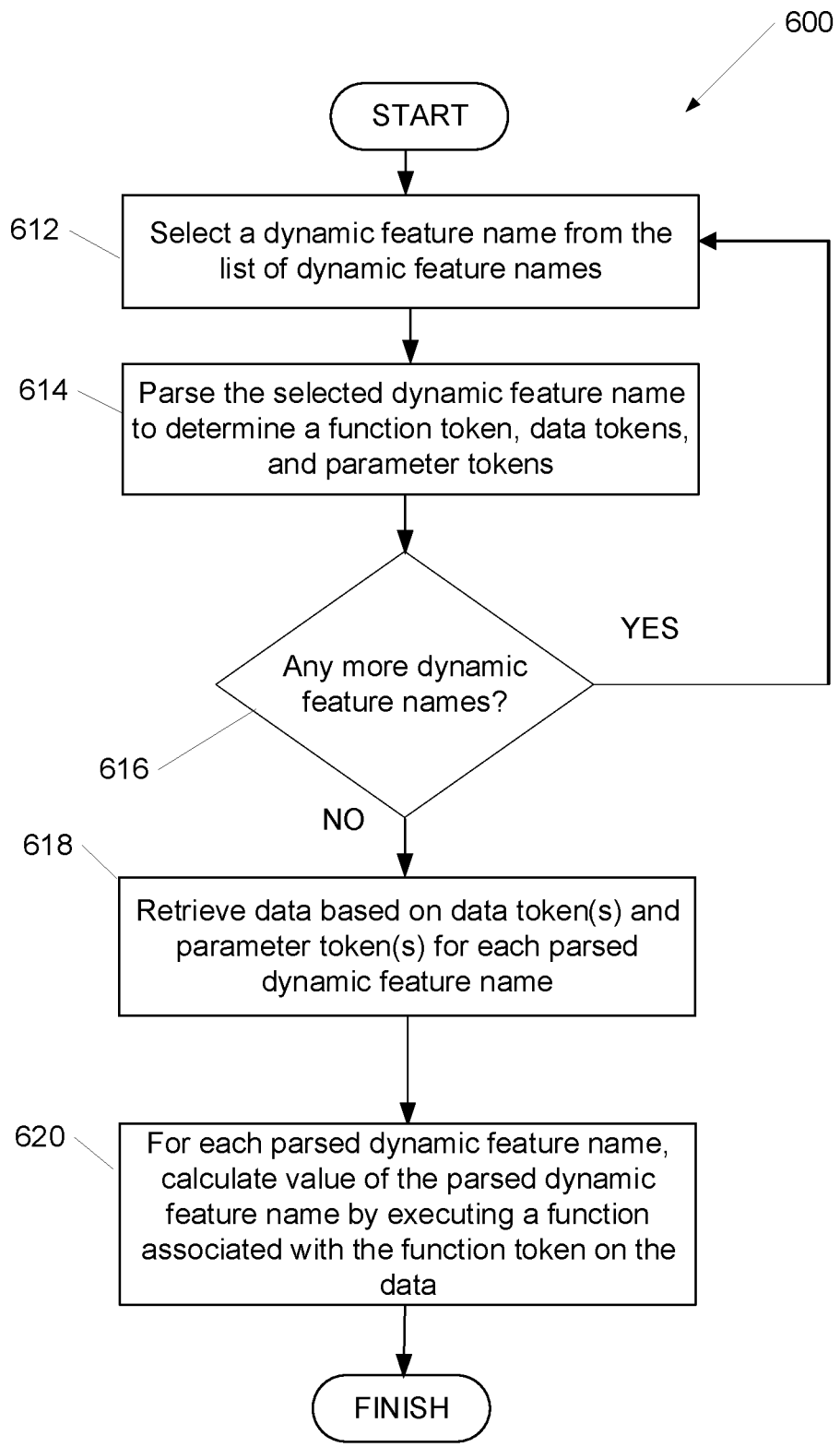
FIG. 6 shows a flowchart of an example process for generating values for dynamic feature names according to one or more aspects of the disclosure.

FIG. 6 shows a flowchart 600 of an example process for generating values for dynamic feature names by a feature generator (e.g., the feature generator 110 in FIG. 1 or the feature generator 302 in FIG. 3). Some or all of the steps of the flowchart 600 may be performed using one or more computing devices as described herein. In some embodiments, the actions in the flowchart may be performed in different orders and with different, fewer, or additional actions than those illustrated in FIG. 6. Multiple actions may be combined and/or divided into sub-actions in some implementations. The various steps of the flowchart 600 are described with the aid of the illustration 700 in FIG. 7.

Figure 7:
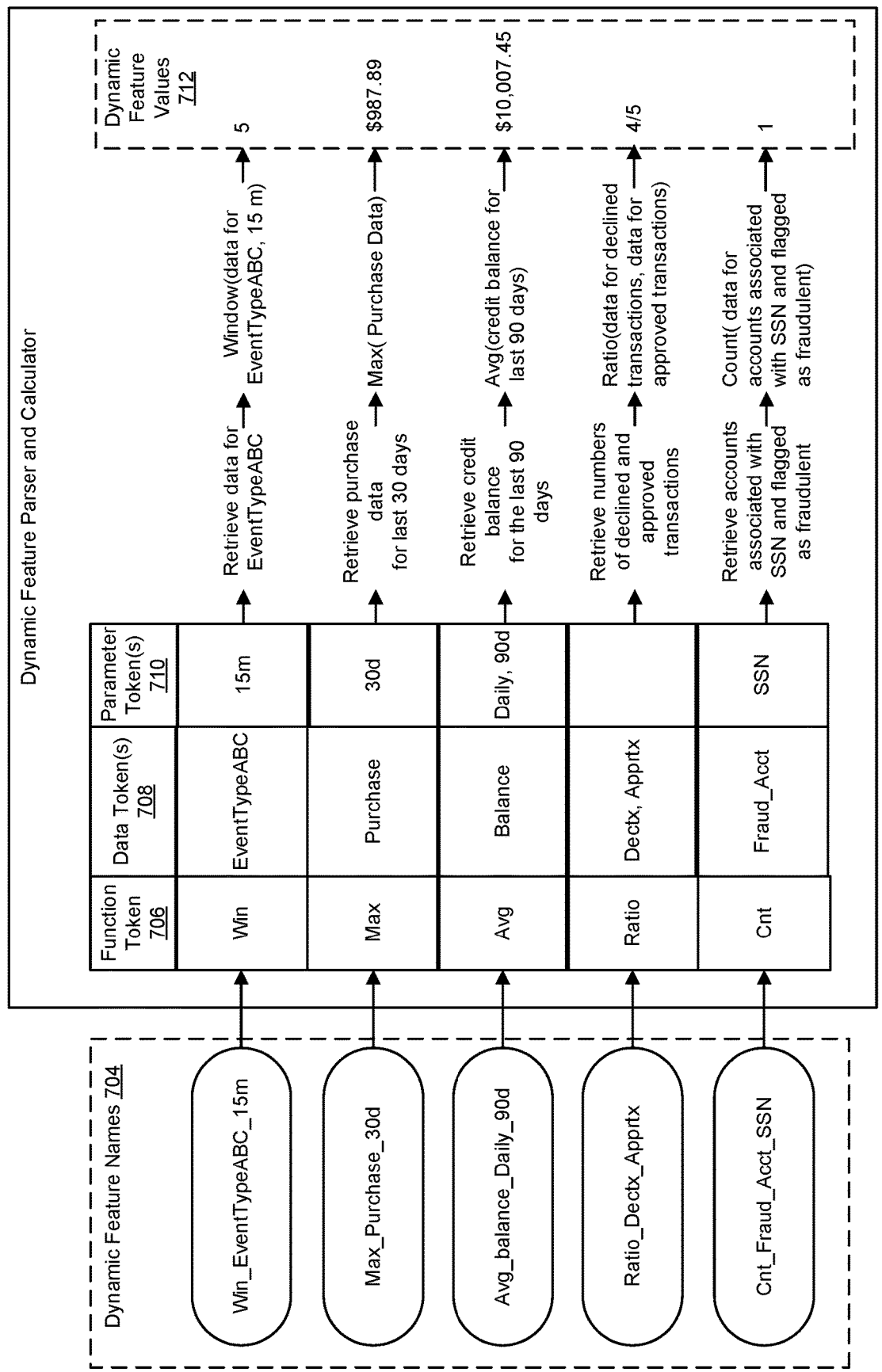
FIG. 7 shows example parsing of dynamic feature names and calculation of values of the dynamic feature names according to one or more aspects of the disclosure

The flowchart 600 begins at step 612, where the feature generator may select a feature name from a list of dynamic feature names (e.g., the list of dynamic feature names 704 in FIG. 7 comprising the feature names the feature generator has classified to be names of dynamic features). The feature generator may randomly select a feature name. Alternately, the feature generator may select feature names in the order they are arranged in the list of dynamic feature names.

At step 614, the feature generator may parse the selected dynamic feature name to determine a function token (e.g., the function token 706 in FIG. 7) and one or more data tokens (e.g., the data token 708 in FIG. 7) by using natural language processing techniques and using one or more grammar rules for identifying tokens in dynamic feature names. The feature generator may also identify one or more parameter tokens (e.g., the parameter token 710 in FIG. 7). Various natural language processing techniques may be used to identify the tokens by using the grammar rules.

For example, the feature generator may tokenize or break the name of the selected dynamic feature into smaller portions, words, or tokens. The tokens may aid in interpreting the instructions to calculate the value of the selected dynamic feature. As illustrated in FIG. 7, the name "Win_EventTypeABC_15m" may be tokenized to generate the tokens "Win," "EventTypeABC," and "15m," the name "Max_Purchase_30d" may be tokenized to generate the tokens "Max," "Purchase," and "30d;" the name "Avg_balance_Daily_90d" may be tokenized to generate the tokens "Avg," "balance," "Daily," and "90d;" the name "Ratio_Dectx_Apprtx" may be tokenized to generate the tokens "Ratio," "Dectx," and "Apprtx;" and the name "Cnt_Fraud_Acct_SSN" may be tokenized to generate the tokens "Cnt," "Fraud," "Acct," and "SSN." Various tokenization methods and libraries may be used by the feature generator. Example libraries may comprise NLTK, Gensim, and/or Keras. Various tokenization methods may comprise delimiter tokenization (split feature name whenever a delimiter, such as a white space, a comma, a stop, a quotation mark, a brace, a pipe, a slash and/or an underscore, is encountered), dictionary-based tokenization (identify tokens based on words already existing in a dictionary), rule-based tokenization (perform tokenization based on a set of rules associated with a grammar), regular expression tokenization (using one or more regular expressions to identify tokens), Penn tree tokenization (using semantic and syntactical annotation of language), Moses tokenizer (using a collection of complex normalization and segmentation logic), and/or sub-word tokenization (most frequently used words are given unique identifiers).

During the tokenization process, the feature generator may identify the different types of tokens. For example, as illustrated in FIG. 7, the feature generator may identify the function token "Win," the data token "EventTypeABC," and the parameter token "15m" from the name "Win_EventTypeABC_15m;" the function token "Max," the data token "Purchase," and the parameter token "30d" from the name "Max_Purchase_30d;" the function token "Avg," the data token "balance," and the parameter tokens "Daily" and "90d" from the name "Avg_balance_Daily_90d;" the function token "Ratio," and the data tokens "Dectx" and "Apprtx" from the name "Ratio_Dectx_Apprtx;" the function token "Cnt," the data token "Fraud_Acct," and the parameter token "SSN" from the name "Cnt_Fraud_Acct_SSN." While the tokens in the dynamic feature names in FIG. 7 are separated by underscore delimiters, it may be appreciated that any form of text may be used to embed tokens indicating instructions for calculating the values of the dynamic features. The feature generator may determine whether the parameter tokens are associated with the function tokens or the data tokens based on the grammar rules for the dynamic feature names If the parameter tokens are associated with the data tokens, the feature generator may use the parameter tokens when retrieving data to calculate the values of the dynamic features. If the parameter tokens are associated with the function tokens, the feature generator may use the parameter tokens when applying or executing functions on the retrieved data. In some examples, the name of a dynamic feature may comprise both tokens associated with the functions tokens and tokens associated with the data tokens.

Referring back to FIG. 6, at step 616, it may be determined (e.g., by the feature generator) whether dynamic feature names of all the dynamic features in the list of dynamic feature names have been parsed. If so, then the process continues at step 618. If not, step 612 may be repeated for the next dynamic feature name in the list of feature names At step 618, after all the dynamic feature names in the list of dynamic feature names have been parsed, the feature generator may retrieve, based on the data token(s) and/or the parameter token(s), data from one or more databases of multiple data sources (e.g., the data sources 106 and/or the databases 122 in FIG. 1) for each of the parsed dynamic feature names For example, for the data token "EventType-ABC," the feature generator may retrieve the data for EventTypeABC; for the data token "Purchase" and the parameter token "30d," the feature generator may retrieve purchase data for the last thirty days; for the data token "balance," and the parameter tokens "Daily" and "90d," the feature generator may retrieve credit balance for the last 90 days; for the data tokens "Dectx" and "Apprtx" the feature generator may retrieve numbers of declined and approved transactions; and for the data token "Fraud_Acct," and the parameter token "SSN," the feature generator may retrieve a number of accounts associated with SSN and flagged as fraudulent. In some embodiments, the feature generator may retrieve the data individually for each parsed dynamic feature name, while in other embodiments, the feature generator may retrieve data for all the parsed dynamic feature name in a batch.

Figure 8:
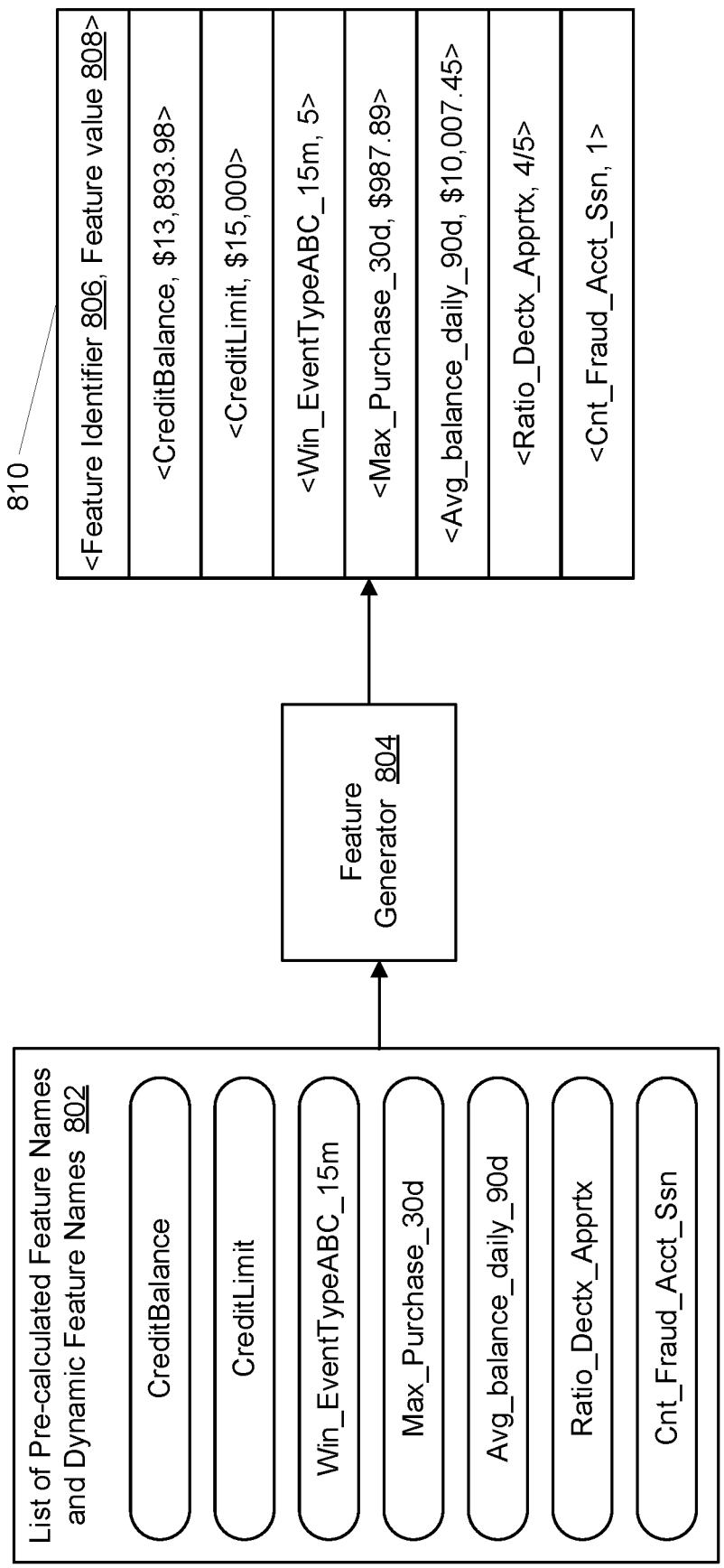
FIG. 8 shows an example output of a feature generator according to one or more aspects of the disclosure.

At step 620, the feature generator may calculate a value (e.g., the dynamic feature values 712 in FIG. 7) for each of the parsed dynamic feature name by executing a function associated with the function token of the parsed dynamic feature name on the retrieved data in step 616 for the parsed dynamic feature name For example, the feature generator may determine: from the data for EventTypeABC and based on the function token "Win" and the parameter token "15m," the number of time event ABC occurred in the last fifteen minutes; from the purchase data for last thirty days and the function token "Max," the maximum purchase made in the last thirty days; from the credit balance data for the last 90 days and the function token "Avg," the average credit balance for the last 90 days; from the data indicating the number of declined and approved transactions and the function token "Ratio," the ratio of the number of declined transactions over the number of approved transactions; and for the data indicating the accounts associated with the SSN and flagged as fraudulent and the function token "Cnt," the number of accounts associated with the SSN and are flagged as fraudulent. The process in flowchart 600 may end after calculating the value of each parsed dynamic feature name FIG. 8 shows an example output 810 generated by a feature generator 804 when supplied with a list of feature names 802. The list of feature names 802 may comprise names of pre-calculated features and/or dynamic features. The output 810 of the feature generator 804 may be used as an input for any data processing or analyzing systems (e.g., the data analyzing engine 112 in FIG. 1). The output 810 of the feature generator 804 may comprise a data structure that allows for a future extension without modifying existing code or data. The data structure for the output 810 may comprise an array, a list, a linked list, a stack, a queue, a set, a table, etc. The data structure of the output 810 may comprise one or more identifier-value pairs (e.g., the <feature identifier 806, feature value 808> pair illustrated in FIG. 8). Each identifier-value pair may be a set of two linked data items: a feature identifier 806, which may be a unique identifier for some item of data, and the feature value 808, which may be either the data that is identified or a pointer to a memory location of that data. Identifier-value pairs may also be referred attribute-value pairs, name-value pairs, key-value pairs, and/or field-value pairs. Each of the feature identifier 804-feature value 808 pair in the output 810 may correspond to one of the feature names in the list of feature names 802. For example, <CreditBalace, S13,893.98> may correspond to the feature name "CreditBalance," <Win_EventTypeABC_15m, 5> may correspond to the feature name "Win_EventTypeABC_15m," etc.

Each feature identifier 806-feature value 808 pair may be separated by an identifier-value separator. An identifier-value separator may separate a feature identifier 806 from the feature value 808 within an identifier-value pair. An identifier-value separator may comprise a delimiter character, such as commas (,), semicolon (;), quotes (", '), braces ({ }), pipes (|), equal (=) and/or slashes (/ \).

In some embodiments, a feature identifier 806 may be associated with multiple feature values. For example, a data processing system for a financial organization may request a feature that indicates the three largest purchases in the last six months. The feature identifier-feature value pair with n number of values may be represented as <feature identifier, feature value 1; feature value 2; feature value 3; . . . feature value n>. A value separator may separate the multiple values within the identifier-value pair. A value separator may comprise a delimiter character, such as commas (,), semicolon (;), quotes (", '), braces ({ }), pipes (|), and/or slashes (/ \).

A value separator may be different from an identifier-value separator to distinguish between the feature identifier and the values. For example, equal signs (=) may be used as an identifier-value separator, and commas (,) or semicolon (;) may be used as a value separator.

One or more aspects discussed herein may be embodied in computer-usable or readable data and/or computer-executable instructions, such as in one or more program modules, executed by one or more computers or other devices as described herein. Generally, program modules may comprise routines, programs, objects, components, data structures, and the like. The program modules may perform particular tasks or implement particular abstract data types when executed by a processor in a computer or other device. The program modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is, therefore, to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:
1. A method, comprising:
receiving, by a computing device, data indicating a request for values of a plurality of features, wherein the data comprises a plurality of names corresponding to respective features of the plurality of features;
determining, by the computing device and from the plurality of names:
names of pre-calculated features, of the plurality of features, with pre-calculated values; and
names of dynamic features, of the plurality of features, wherein for each of the dynamic features:
a name of the dynamic feature comprises an embedded instruction for calculating, based on a dynamic feature grammar, a dynamic values of the dynamic feature, and the embedded instruction is arranged in the following order: a function token, one or more data tokens, and one or more parameter tokens;
parsing, by the computing device and using the dynamic feature grammar, the embedded instruction in the name of each of the dynamic features to determine, from the parsed embedded instruction and for the dynamic feature, the function token, the one or more data tokens, and the one or more parameter tokens;
determining, by the computing device, a dynamic value of each of the dynamic features based on the function token, the one or more data tokens, and the one or more parameter tokens; and
causing, by the computing device and in response to the request for the values of the plurality of features, output of the pre-calculated values of the pre-calculated features and the dynamic values of the dynamic features.

2. The method of claim 1, wherein causing output of the pre-calculated values of the pre-calculated features comprises:
retrieving, by the computing device, from one or more databases and based on the names of the pre-calculated features, the pre-calculated values.

3. The method of claim 1, wherein determining the dynamic value of each of the dynamic features comprises:
retrieving, by the computing device and using the one or more data tokens, data from one or more databases; and
executing a function, corresponding to the function token, on the retrieved data.

4. The method of claim 3,
wherein retrieving the data comprises retrieving the data further based on the one or more parameter tokens.

5. The method of claim 3,
wherein executing the function comprises executing, based on the one or more parameter tokens, the function on the retrieved data.

6. The method of claim 1, wherein determining the names of the pre-calculated features and the names of the dynamic features comprises classifying, by using the dynamic feature grammar, the names of the pre-calculated features and the names of the dynamic features.

7. The method of claim 1, wherein parsing the embedded instruction of each of the dynamic features comprises parsing the embedded instruction using natural language processing models.

8. The method of claim 1, wherein the output comprises a plurality of key-value pairs corresponding to the plurality of features, wherein each key-value pair, of the plurality of key-value pairs, comprises;
an identifier of a corresponding feature of the plurality of features; and
a value of the corresponding feature.

9. The method of claim 1, where causing the output comprises providing, to one or more machine learning models, the pre-calculated values of the pre-calculated features and the dynamic values of the dynamic features.

10. An apparatus, comprising:
one or more processors; and
memory storing instructions that, when executed by the one or more processors, cause the apparatus to:
receive data indicating a request for values of a plurality of features, wherein the data comprises a plurality of names corresponding to respective features of the plurality of features;
determine, from the plurality of names:
names of pre-calculated features, of the plurality of features, with pre-calculated values; and
names of dynamic features, of the plurality of features, wherein for each of the dynamic features:
a name of the dynamic feature comprises an embedded instruction for calculating, based on a dynamic feature grammar, a dynamic value of the dynamic feature, and
the embedded instruction is arranged in the following order: a function token, one or more data tokens, and one or more parameter tokens;
parse, using the dynamic feature grammar, the embedded instruction in the name of each of the dynamic features to determine, from the parsed embedded instruction and for the dynamic feature, the function token, the one or more data tokens, and the one or more parameter tokens;
determine, based on the one or more parameter tokens, a dynamic value of each of the dynamic features, wherein the instructions cause the apparatus to determine the dynamic value of each of the dynamic features by causing the apparatus to:
retrieve, using the one or more data tokens, data from one or more databases; and
execute a function, corresponding to the function token, on the retrieved data; and
cause output of the pre-calculated values of the pre-calculated features and the dynamic values of the dynamic features.

11. The apparatus of claim 10, wherein the instructions cause the apparatus to cause output of the pre-calculated values of the pre-calculated features by causing the apparatus to:
retrieve, from one or more databases and based on the names of the pre-calculated features, the pre-calculated values.

12. The apparatus of claim 10,
wherein the instructions cause the apparatus to retrieve the data by causing the apparatus to retrieve the data further based on the one or more parameter tokens.

13. The apparatus of claim 10,
wherein the instructions cause the apparatus to execute the function by causing the apparatus to execute, based on the one or more parameter tokens, the function on the retrieved data.

14. The apparatus of claim 10, wherein the instructions cause the apparatus to determine the names of the pre-calculated features and the names of the dynamic features by causing the apparatus to:
classify, using the dynamic feature grammar, the names of the pre-calculated features and the names of the dynamic features.

15. The apparatus of claim 10, wherein the instructions cause the apparatus to parse the embedded instruction of each of the dynamic features by using natural language processing models.

16. The apparatus of claim 10, wherein the instructions cause the apparatus to output the pre-calculated values of the pre-calculated features and the dynamic values of the dynamic features by causing the apparatus to:
provide, to one or more machine learning models, the pre-calculated values of the pre-calculated features and the dynamic values of the dynamic features.

17. A non-transitory machine-readable medium storing instructions that, when executed by one or more processors, cause the one or more processors to perform steps comprising:

receiving data indicating a request for values of a plurality of features, wherein the data comprises a plurality of names corresponding to respective features of the plurality of features;

determining, from the plurality of names:
- names of pre-calculated features, of the plurality of features, with pre-calculated values; and
- names of dynamic features, of the plurality of features, wherein for each of the dynamic features:
  - a name of the dynamic feature comprises an embedded instruction for calculating, based on a dynamic feature grammar, a dynamic value of the dynamic feature, and
  - the embedded instruction is arranged in the following order: a function token, one or more data tokens, and one or more parameter tokens;

retrieving, from one or more databases and based on the names of the pre-calculated features, the pre-calculated values;

parsing, by using the dynamic feature grammar, the embedded instruction in the name of each of the dynamic features to determine, from the parsed embedded instruction and for the dynamic feature, the function token, the one or more data tokens, and the one or more parameter tokens;

determining, based on the one or more parameter tokens, a dynamic value of each of the dynamic features by:
- retrieving, by using the one or more data tokens, data from one or more databases; and
- executing a function, corresponding to the function token, on the retrieved data; and causing output of the pre-calculated values of the pre-calculated features and the dynamic values of the dynamic features.

18. The non-transitory machine-readable medium of claim 17,
wherein the instructions, when executed by the one or more processors, cause retrieving the data by retrieving the data further based on the one or more parameter tokens.

19. The non-transitory machine-readable medium of claim 17,
wherein the instructions, when executed by the one or more processors, cause executing the function by executing, based on the one or more parameter tokens, the function on the retrieved data.

20. The non-transitory machine-readable medium of claim 17, wherein the instructions, when executed by the one or more processors, cause outputting the pre-calculated values of the pre-calculated features and the dynamic values of the dynamic features by:
providing, to one or more machine learning models, the pre-calculated values of the pre-calculated features and the dynamic values of the dynamic features.

* * * * *